US008991011B2

(12) United States Patent
Liu

(10) Patent No.: US 8,991,011 B2
(45) Date of Patent: Mar. 31, 2015

(54) HINGE MECHANISM

(71) Applicant: Acer Incorporated, New Taipei (TW)

(72) Inventor: Chi-Yuan Liu, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/028,556

(22) Filed: Sep. 17, 2013

(65) Prior Publication Data

US 2014/0165334 A1    Jun. 19, 2014

(30) Foreign Application Priority Data

Dec. 19, 2012    (TW) .............................. 101224582 U

(51) Int. Cl.
*E05C 17/64* (2006.01)
*G06F 1/16* (2006.01)

(52) U.S. Cl.
CPC .................................. *G06F 1/1613* (2013.01)
USPC ................... 16/337; 16/303; 16/330; 16/342; 361/679.27

(58) Field of Classification Search
CPC ............ E05Y 2900/606; E05D 11/082; E05D 11/084; E05D 11/087; G06F 1/1616; G06F 1/1681
USPC ........... 16/333, 337–343, 347, 386, 303, 330; 361/679.27
See application file for complete search history.

(56) References Cited

U.S. PATENT DOCUMENTS

| | | | | |
|---|---|---|---|---|
| 6,230,365 B1 * | 5/2001 | Lu | .................................. | 16/342 |
| 6,862,779 B1 * | 3/2005 | Lu et al. | .......................... | 16/340 |
| 7,533,446 B1 * | 5/2009 | Lin | .................................. | 16/330 |
| 8,082,626 B2 * | 12/2011 | Chiang | .......................... | 16/297 |
| 8,141,206 B2 * | 3/2012 | Chen et al. | ...................... | 16/342 |
| 8,205,301 B2 * | 6/2012 | Wang et al. | ..................... | 16/330 |
| 8,369,085 B2 * | 2/2013 | Hu | ........................... | 361/679.55 |
| 2010/0101053 A1 * | 4/2010 | Li et al. | .......................... | 16/341 |

* cited by examiner

*Primary Examiner* — William Miller
(74) *Attorney, Agent, or Firm* — Jianq Chyun IP Office

(57) ABSTRACT

A hinge mechanism for a foldable electronic device is provided. The hinge mechanism includes a hinge, a pivot part and a friction part. The hinge and the pivot part are fixed to a first body and a second body of the foldable electronic device respectively. The friction part is connected to the pivot part and selectively contacting the hinge. When the pivot part rotates relative to the hinge to drive the first body to rotate from a close position to an open position in relative to the second body, the friction part does not contact the hinge. When the pivot part rotates relative to the hinge to drive the first body to rotate from the open position to the close position in relative to the second body, the friction part contacts the hinge and limits a rotation of the pivot part on the hinge.

8 Claims, 4 Drawing Sheets

HINGE MECHANISM

CROSS-REFERENCE TO RELATED APPLICATION

This application claims the priority benefit of Taiwan application serial no. 101224582, filed on Dec. 19, 2012. The entirety of the above-mentioned patent application is hereby incorporated by reference herein and made a part of this specification.

BACKGROUND OF THE INVENTION.

1. Field of the Invention

The invention relates to a hinge mechanism, and more particularly, to a hinge mechanism with adjustable torsion.

2. Description of Related Art

Along with the ongoing development of technologies, new generations of electronic products with more complex and user-friendly functions are coming forth to replace old products. Take computers for example, the computers have gradually become an indispensable tool in daily lives and jobs of ordinary people. A notebook is provided with identical functions of a desktop computer and characteristics of small in size and light in weight, which is quite convenient for users to carry around.

Currently, since a weight of the notebook computer is getting lighter, in which when a screen is opened and a torsion of a hinge mechanism therein is set to be overly huge, a body can be lift up by the torsion of the hinge mechanism. In order to prevent the body from being lift up when the screen is opened, a user needs to the hold the body down with one hand while opening the screen with another hand, which is not convenient in use resulted from the user is required to use both hands to rotate the screen of the notebook computer open.

In case the torsion of the hinge mechanism is set to relatively smaller so as to prevent the body from being lift up by the torsion of the hinge mechanism, when the screen is closed, the screen may automatically fall down due to insufficient torsion, thereby causing damages to the screen.

SUMMARY OF THE INVENTION

The invention is directed to a hinge mechanism which can provide a torsion with different magnitudes based on actual operating conditions. When a screen is opened, the hinge mechanism can provide the torsion sufficient enough to prevent a body from being lift up. When the screen is closed, the hinge mechanism can provide additional friction to increase the torsion to support the screen, so that the screen is not damaged since the screen does not automatically fall down now.

The invention provides a hinge mechanism for a foldable electronic device. The foldable electronic device includes a first body and a second body. The hinge mechanism includes a hinge, a pivot part and a friction part. The hinge is suitable to be fixed on the first body. The pivot part is pivoted to the hinge and suitable to be connected to the second body. The friction part is connected to the pivot part and selectively contacting the hinge. When the pivot part rotates relative to the hinge to drive the first body to rotate from a close position to an open position relative to the second body, the friction part does not contact the hinge. When the pivot part rotates relative to the hinge to drive the first body to rotate from the open position to the close position relative to the second body, the friction part contacts the hinge and limits a rotation of the pivot part on the hinge.

In summary, the hinge mechanism of the invention is installed with the friction part, and when the hinge is in the opened state relative to the friction part, the friction part does not contact the hinge, so that the first body and the second body can make the foldable electronic device to open by using the torsion provided by the hinge mechanism. In this case, the torsion for opening is set be relatively smaller, so the user can easily rotate the first body open, and the second body is not lift up together with the first body. However, the torsion provided by the hinge mechanism being too small can cause the first body to automatically fall down. In other words, when the hinge is in the closed state relative to the friction part, the first body may automatically fall down to impact the second body due to insufficient torsion, thereby damaging the first body. Accordingly, it is designed in the invention that, when the foldable electronic device is in the closed state, the friction part contacts the hinge to limit the rotation of the pivot part on the hinge, so as to increase the torsion of the pivot part relative to the hinge. Therefore, the hinge mechanism of the invention is capable of providing the torsion with different magnitudes based on actual operating conditions.

In order to make the aforementioned and other features and advantages of the invention more comprehensible, several embodiments accompanied with figures are described in detail below.

DESCRIPTION OF THE EMBODIMENTS

Figure 1A:
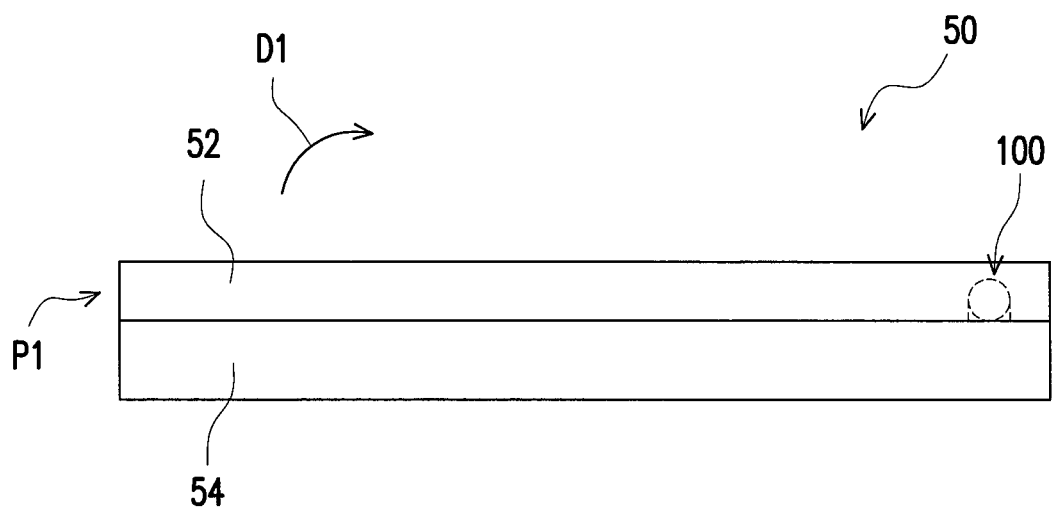
FIG. 1A and FIG. 1B are schematic diagrams respectively illustrating the foldable electronic device in different states according to an embodiment of the invention.
Figure 1B:
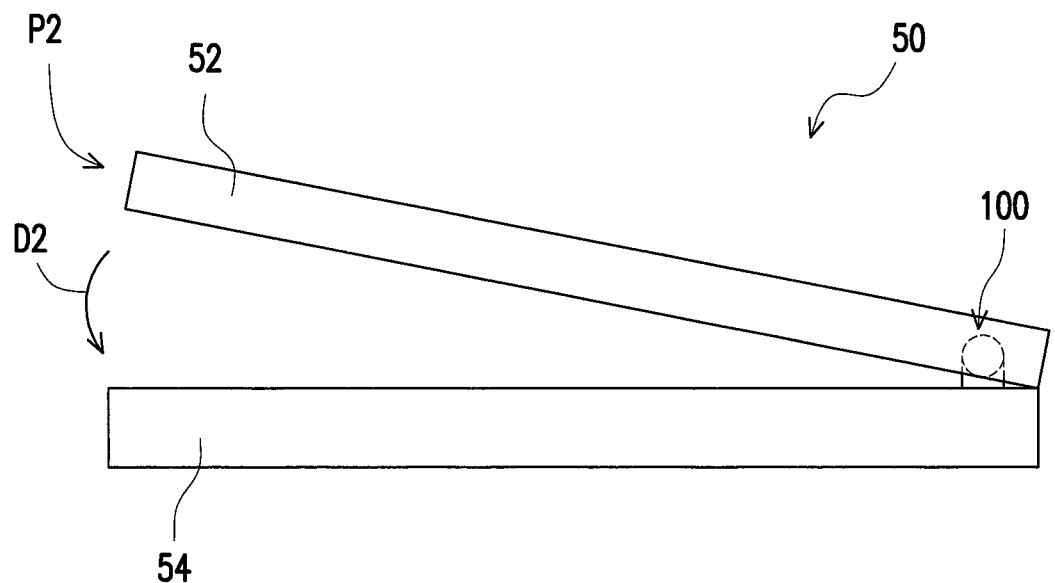

FIG. 1A and FIG. 1B are schematic diagrams respectively illustrating the foldable electronic device in different states according to an embodiment of the invention. Referring to FIG. 1A and FIG. 1B, in the present embodiment, a foldable electronic device 50 includes a first body 52, a second body 54 and a hinge mechanism 100.

In the present embodiment, the hinge mechanism 100 can be utilized to rotate the first body 52 relative to the second body 54, so as to open (as shown in FIG. 1B) or close (as shown in FIG. 1A) the foldable electronic device 100. The foldable electronic device 50 is, for example, a notebook combined by a display module (the first body 52) and an input module (the second body 54), but types of the first body 52 and the second body 54 are limited thereto. The first body 52 can include a display screen, and the second body 54 can include a keyboard, such that a user can operate the foldable electronic device 50 through the keyboard and view a picture displayed by the display screen.

In the invention, within a specific rotation range, the hinge mechanism 100 can provide different torsions to the first body 52 rotate relative to the second body 54. It will be further described with reference to the figures.

Figure 2:
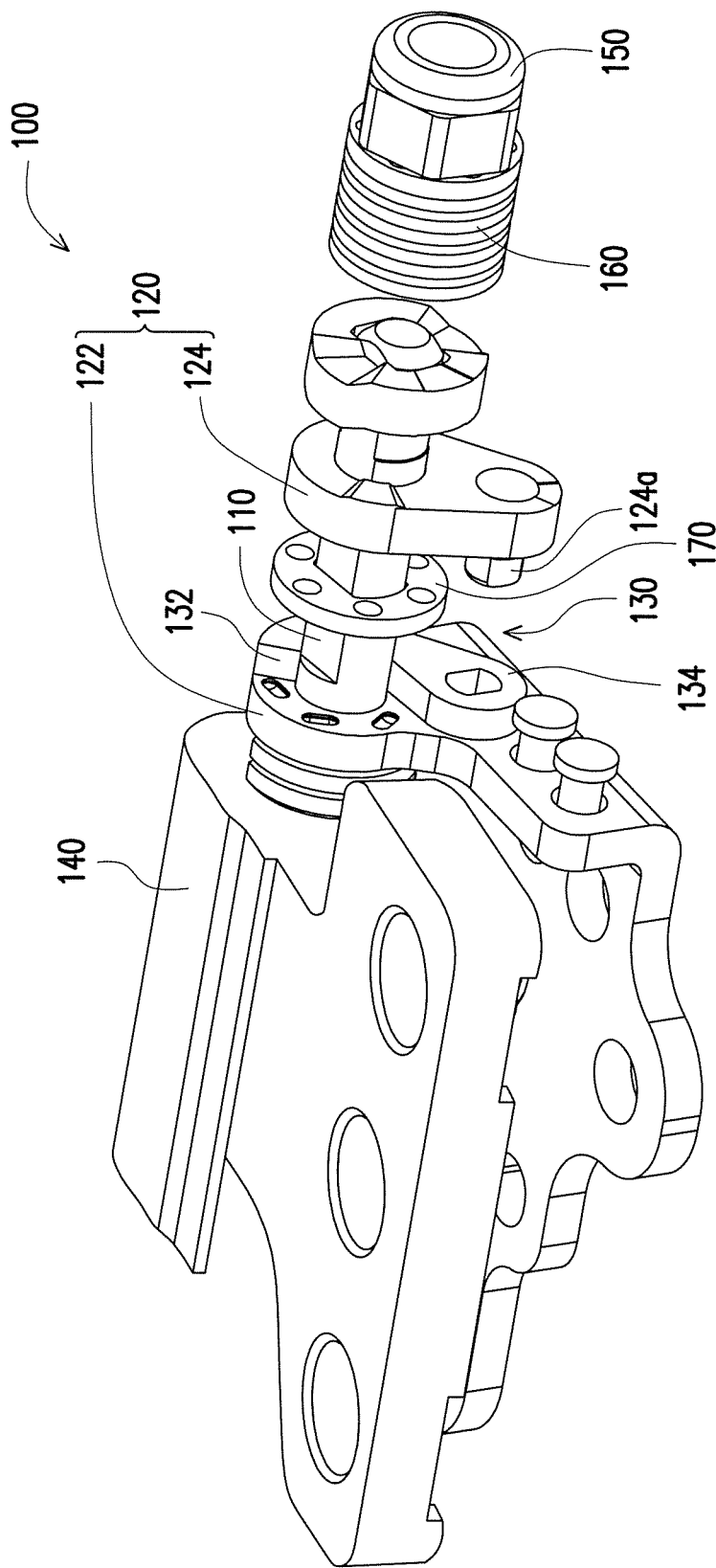
FIG. 2 is a schematic diagram illustrating a hinge mechanism of the foldable electronic device depicted in FIG. 1B.
Figure 3:
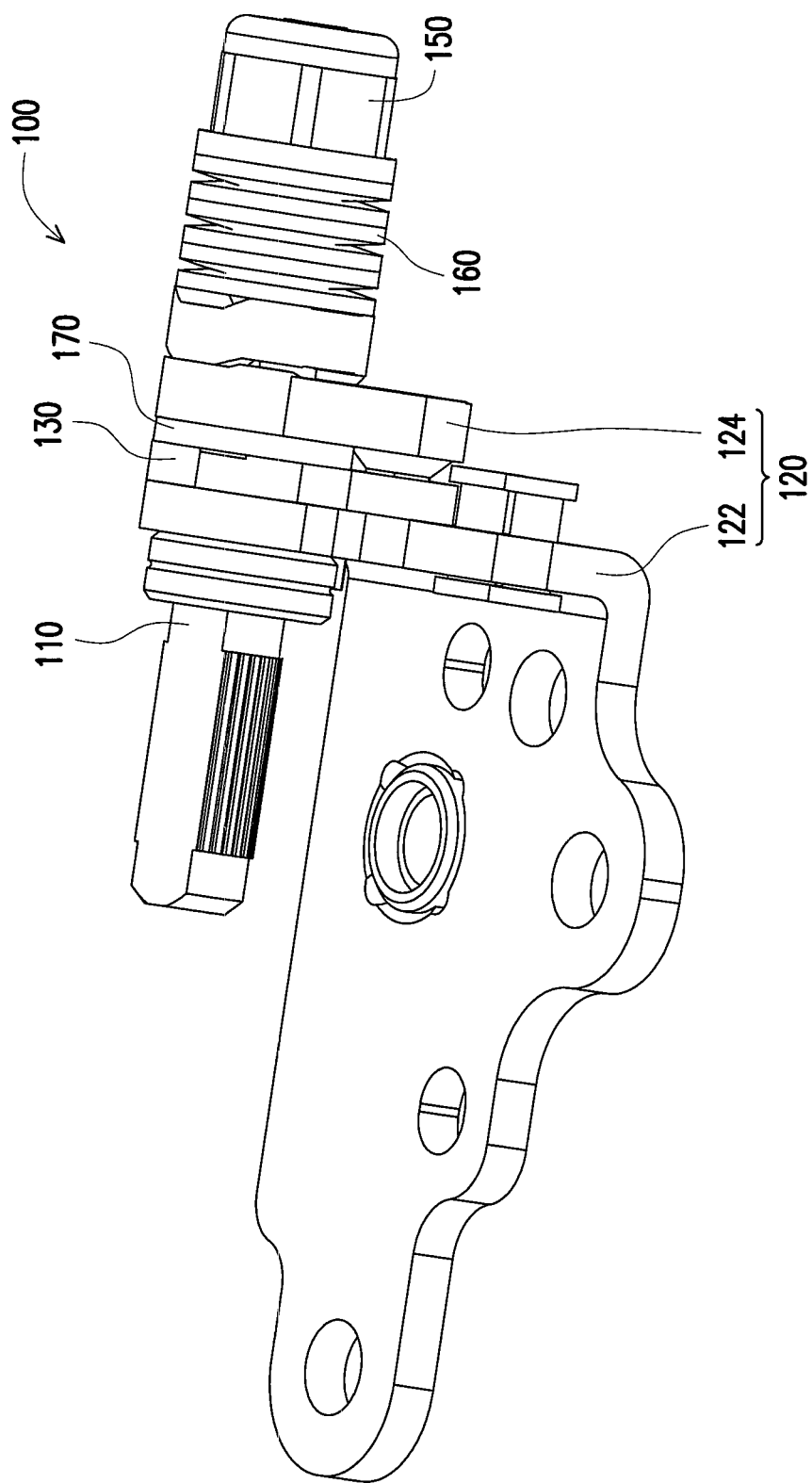
FIG. 3 is a schematic diagram illustrating a hinge mechanism of the foldable electronic device depicted in FIG. 1B.

FIG. 2 is a schematic diagram illustrating a hinge mechanism of the foldable electronic device depicted in FIG. 1B. FIG. 3 is a schematic diagram illustrating a hinge mechanism of the foldable electronic device depicted in FIG. 1B. It should be noted that, in order to simplify the description, the components depicted in FIG. 2 are slightly separated from each other. Referring to FIG. 1A, FIG. 1B and FIG. 2 to FIG. 3, in the present embodiment, the hinge mechanism 100 includes a hinge 110, a pivot part 120 and a friction part 130. The hinge 110 is suitable to be fixed on the first body 52. In the present embodiment, the hinge 110 is connected to the first body 52 through a locking method. For instance, the hinge mechanism 100 of the present embodiment further includes a holder 140. The hinge 110 is fixed on the holder 140, and the holder 140 is fixed on the first body 52, so that the hinge 110 is fixed on the first body 52. However, a connection method for the hinge 110 and the first body 52 is not limited thereto.

In the present embodiment, the pivot part 120 is pivoted to the hinge 110 and suitable to be connected to the second body 54. The pivot part 120 can rotate relative to the hinge 110, so that the first body 52 connected to the hinge 110 can rotate relative to the second body 54 connected to the pivot part 120. More specifically, the pivot part 120 includes a first pivot portion 122 and a second pivot portion 124 moved with the first pivot portion 122. The first pivot portion 122 is suitable to be connected to the second body 54 (e.g., through the locking method), that is, the pivot part 120 of the present embodiment is fixed on the second body 54 through the first pivot portion 122. The second pivot portion 124 limits the friction part 130 between the first pivot portion 122 and the second pivot portion 124 through a fixing part 124a. That is, the friction part 130 is located between the first pivot portion 122 and the second pivot portion 124, and moved with the first pivot portion 122 and the second pivot portion 124.

Further, when the first body 52 rotates relative to the second body 54 in a specific operating condition (i.e., an opened state depicted in FIG. 1B or a closed state depicted in FIG. 1A), a relative position between the first body 52 and the second body 54 can be maintained, and different torsions are provided to the first body 52 and the second body 54 within the specific rotation range. That is, when the user rotates the first body 52 along a clockwise direction D1 from the state depicted in FIG. 1A to the state depicted in FIG. 1B, the foldable electronic device 50 is in the opened state, and the second body 54 is not lift up accompanied with the first body 52. On the other hand, when the user rotates the first body 52 along a counterclockwise direction D2 from the state depicted in FIG. 1B to the state depicted in FIG. 1A, the foldable electronic device 50 is in the closed state, which prevents the first body 52 from not being supported due to insufficient torsion. Therefore, the first body 52 does not automatically fall down during the closed state, such that the first body 52 can be effectively protected from damages.

In the present embodiment, the friction part 130 is connected to the pivot part 120 and selectively contacting the hinge 110. When the pivot part 120 rotates relative to the hinge 110 to drive the first body 52 to rotate from a close position P1 depicted in FIG. 1A to an open position P2 depicted in FIG. 1B along the clockwise direction D1 relative to the second body 54, the friction part 130 does not contact the hinge 110. When the pivot part 120 rotates relative to the hinge 110 to drive the first body 52 to rotate from the open position P2 depicted in FIG. 1B to the close position P1 depicted in FIG. 1A along the counterclockwise direction D2 relative to the second body 54, the friction part 130 contacts the hinge 110 and limits a rotation of the pivot part 120 on the hinge 110. It should be noted that, the clockwise direction D1 and the counterclockwise direction D2 are merely illustrative examples that explain opening and closing of the foldable electronic device, but the invention is not limited thereto.

With such configuration, the hinge mechanism 100 of the invention is installed with the friction part 130, and when the hinge 110 is in the opened state relative to the friction part 130 (i.e., when the first body 52 rotates from the close position P1 depicted in FIG. 1A to the open position P2 depicted in FIG. 1B along the clockwise direction D1 relative to the second body 54), the friction part 130 does not contact the hinge 110, so that the first body 52 and the second body 54 can make the foldable electronic device to exhibit as the open position P2 depicted in FIG. 1B by using the torsion provided by the hinge mechanism 100. In this case, the torsion for opening is set be relatively less, the user can easily rotate the first body 52 open, while a weight of the second body 54 is sufficient to resist the torsion of the hinge mechanism 100 without being lift up. This can prevent the second body 54 from impacting a desktop or a plane contacted thereto, so that the components in the second body 54 are not damaged due to impact.

However, the torsion provided by the hinge mechanism 100 being too small can cause the first body 52 to automatically fall down. In other words, when the hinge 110 is in the closed state relative to the friction part 130 (i.e., when the first body 52 rotates from the open position P2 depicted in FIG. 1B to the close position P1 depicted in FIG. 1A along the counterclockwise direction D2 relative to the second body 54), the first body 52 may automatically fall down to impact the second body 54 due to insufficient torsion, thereby damaging the first body 52. Accordingly, it is designed in the invention that, when the foldable electronic device 50 is in the closed state, the friction part 130 contacts the hinge 110 to limit the rotation of the pivot part 120 on the hinge 110, so as to increase the torsion of the pivot part 120 relative to the hinge 110. Hence, the torsion between the hinge 110 and the pivot part 120 is increased. In other words, during the process in which the first body 52 rotates from the open position P2 depicted in FIG. 1B to the close position P1 depicted in FIG. 1A relative to the second body 54, since the torsion between the first body 52 and the second body 54 is relatively greater (with respect to the opened state), the problem of the first body 52 being damaged can be effectively prevented since the first body 52 does not automatically fall down now. Therefore, the hinge mechanism 100 of the invention can provide the torsion with different magnitudes based on actual operating conditions, such that the foldable electronic device 50 can have a relatively smaller torsion when being opened while having a relatively greater torsion when being closed.

In addition, the hinge mechanism 100 further includes a locking portion 50 and a linking-up part 160. The locking portion 150 is locked on the hinge 110. The linking-up part 160 is, for example, a torque shim telescoped on the hinge 110 and located between the locking portion 150 and the friction part 130, and the linking-up part 160 is locked tightly to the hinge 110 through the locking portion 150. In the present embodiment, the locking portion 150 is a nut cap having an internal thread, and a portion of the hinge 110 has an external thread corresponding to the internal thread of the nut cap. Of course, the hinge mechanism 100 of the present embodiment, a tightness between each element being inserted to the hinge 110 can be changed by adjusting a position of the locking portion 150 relative to the hinge 110, such that a basic magnitude of the torsion between the first body 52 and the second body 54 can also be adjusted in order to meet actual rotation conditions for different bodies.

Figure 4A:
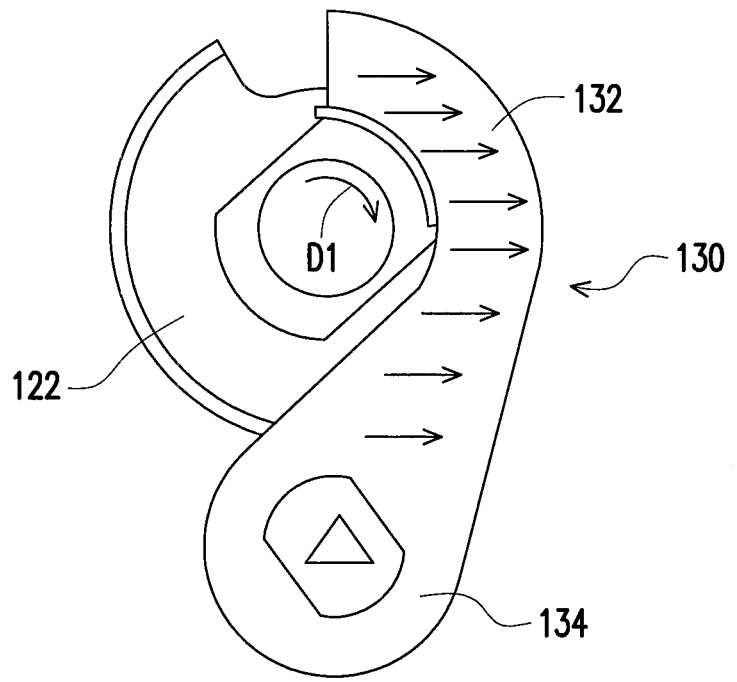
FIG. 4A and FIG. 4B are schematic diagrams respectively illustrating FIG. 1A and FIG. 1B in different states.
Figure 4B:
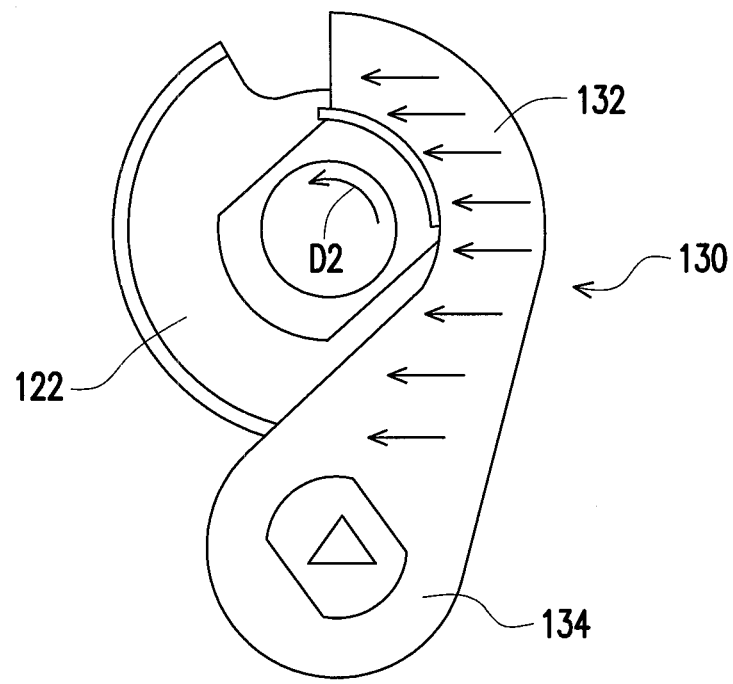

FIG. 4A and FIG. 4B are schematic diagrams respectively illustrating FIG. 1A and FIG. 1B in different states. Referring to FIG. 1A, FIG. 1B, FIG. 2 and FIG. 3 to FIG. 4B together. In the present embodiment, the hinge mechanism 100 further includes a rotation part 170. The rotation part 170 is telescoped on the hinge 110. More specifically, the friction part 130 has a contact portion 132 and a fixing portion 134, in which the fixing portion is assembled together with the pivot part 120. When the pivot part 120 rotates relative to the hinge 110 to drive the first body 52 to rotate from the close position P1 depicted in FIG. 1A to the open position P2 depicted in FIG. 1B along the clockwise direction D1 relative to the second body 54, as shown in FIG. 4, the rotation part 170 drives friction part 130 (i.e., along an arrow direction depicted in FIG. 4A) to move far away from the hinge 110, so that the friction part 130 does not contact the hinge 110. Therefore, the contact portion 132 is far away from the hinge 110 as shown in FIG. 4A and without any friction, so that the first body 52 and the second body 54 can make the foldable electronic device to exhibit as the open position P2 depicted in FIG. 1B by using the torsion provided by the hinge mechanism 100. Of course, the hinge mechanism 100 can adjust the torsion thereof based on actual body conditions in order to meet demands in different conditions.

In the present embodiment, when the pivot part 120 rotates relative to the hinge 110 to drive the first body 52 to rotate from the open position P2 depicted in FIG. 1B to the close position P1 depicted in FIG. 1A along the counterclockwise direction D2 relative to the second body 54, as shown in FIG. 4B, the friction part 130 contacts the hinge 110 and the friction part 130 provides a friction to pivot part 120, so as to limit the rotation of the pivot part 120 on the hinge 110. Therefore, the torsion between the hinge 110 and the pivot part 120 is increased, so as to provide the torsion which is different from that of the open state.

More specifically, when the pivot part 120 rotates relative to the hinge 110 to drive the first body 52 to rotate from the open position P2 depicted in FIG. 1B to the close position P1 depicted in FIG. 1A along the counterclockwise direction D2 relative to the second body 54, the rotation part 170 drives the friction part 130 to move towards the hinge 110 (i.e., along an arrow direction as shown in FIG. 4B), so that the friction part 130 contacts the hinge 110 and clamps the hinge 110 tightly, so as to make the contact portion 132 to contact the hinge 110 to increase the friction of the pivot part 120 relative to the hinge 110. Therefore, the torsion between the hinge 110 and the pivot part 120 is increased (with respect to the open state as described above), such that the problem of the first body 52 being damaged can be effectively prevented since the first body 52 does not automatically fall down now.

In summary, the hinge mechanism of the invention is installed with the friction part, and when the hinge is in the opened state relative to the friction part, the friction part does not contact the hinge, so that the first body and the second body can make the foldable electronic device to open by using the torsion provided by the hinge mechanism. In this case, the torsion for opening is set be relatively smaller, so the user can easily rotate the first body open, while a weight of the second body is sufficient enough to resist the torsion of the hinge mechanism without being lift up. This can prevent the second body from impacting a desktop or a plane contacted thereto, so that the components in the second body are not damaged due to impact.

However, the torsion provided by the hinge mechanism being too small can cause the first body to automatically fall down. In other words, when the hinge is in the closed state relative to the friction part, the first body may automatically fall down to impact the second body due to insufficient torsion, thereby damaging the first body. Accordingly, it is designed in the invention that, when the foldable electronic device is in the closed state, the friction part contacts the hinge to limit the rotation of the pivot part on the hinge, so as to increase the torsion of the pivot part relative to the hinge. Hence, the torsion between the hinge and the pivot part is increased. In other words, during the process in which the first body rotates i from the open position to the close position n relative to the second body, since the torsion between the first body and the second body is relatively greater, the problem of the first body being damaged can be effectively prevented since the first body does not automatically fall down now.

Therefore, the hinge mechanism of the invention can provide the torsion with different magnitudes based on actual operating condition, such that the foldable electronic device can have a relatively smaller torsion when being opened while having a relatively greater torsion when being closed. Moreover, manufacturers may select different shapes for the friction part according to a rotation range for increasing the torsion when the first body rotates relative to the second body, so as to enlarge the contact area in order to meet the demands in different conditions.

Although the invention has been described with reference to the embodiments thereof, it will be apparent to one of the ordinary skills in the art that modifications to the described embodiments may be made without departing from the spirit of the invention. Accordingly, the scope of the invention will be defined by the attached claims not by the above detailed description.

What is claimed is:

1. A hinge mechanism for a foldable electronic device having a first body and a second body, comprising:
   a hinge suitable to be fixed on the first body;
   a pivot part pivoted to the hinge and suitable to be connected to the second body;
   a friction part connected to the pivot part and selectively contacting the hinge, wherein when the pivot part rotates relative to the hinge to drive the first body to rotate from a close position to an open position relative to the second body, the friction part does not contact the hinge; and when the pivot part rotates relative to the hinge to drive the first body to rotate from the open position to the close position relative to the second body, the friction part contacts the hinge to limit a rotation of the pivot part on the hinge; and
   a rotation part telescoped on the hinge and contacting the friction part, wherein when the pivot part rotates relative to the hinge to drive the first body to rotate from the close position to the open position relative to the second body, the rotation part rotates with the hinge to drive the friction part to move far away from the hinge, so that the friction part does not contact the hinge; and when the pivot part rotates relative to the hinge to drive the first body to rotate from the open position to the close position relative to the second body, the rotation part drives the friction part to move towards the hinge, so that the friction part contacts the hinge and clamps the hinge tightly.

2. The hinge mechanism of claim 1, wherein when the pivot part rotates relative to the hinge to drive the first body to rotate from the open position to the close position relative to the second body, the friction part contacts the hinge and provides a friction to the pivot part to limit the rotation of the pivot part on the hinge.

3. The hinge mechanism of claim 2, wherein the friction part has a contact portion, when the pivot part rotates relative to the hinge to drive the first body to rotate from the close position to the open position relative to the second body, the contact portion is far away from the hinge; and when the pivot part rotates relative to the hinge to drive the first body to rotate from the open position to the close position relative to the second body, the contact portion contacts the hinge to increase the friction of the pivot part relative to the hinge.

4. The hinge mechanism of claim 1, wherein the friction part has a fixing portion and the fixing portion is assembled together with the pivot part.

5. The hinge mechanism of claim 1, wherein the pivot part includes a first pivot portion and a second pivot portion moved with the first pivot portion, the first pivot portion being suitable to be connected to the second body, and the friction part being located between the first pivot portion and the second pivot portion.

6. The hinge mechanism of claim 1, further comprising:
   a locking portion locked to the hinge.

7. The hinge mechanism of claim 6, further comprising:
   a linking-up part telescoped on the hinge and located between the locking portion and the friction part, and the linking-up part being locked tightly to the hinge through the locking portion.

8. The hinge mechanism of claim 1, further comprising:
   a holder suitable to be fixed on the first body, wherein the hinge is fixed on the holder.

* * * * *